June 19, 1951
C. N. HUNTLEY ET AL
2,557,745
METHOD AND APPARATUS FOR BRAZING CYLINDRICAL STOCK
Filed Dec. 31, 1947
3 Sheets-Sheet 1
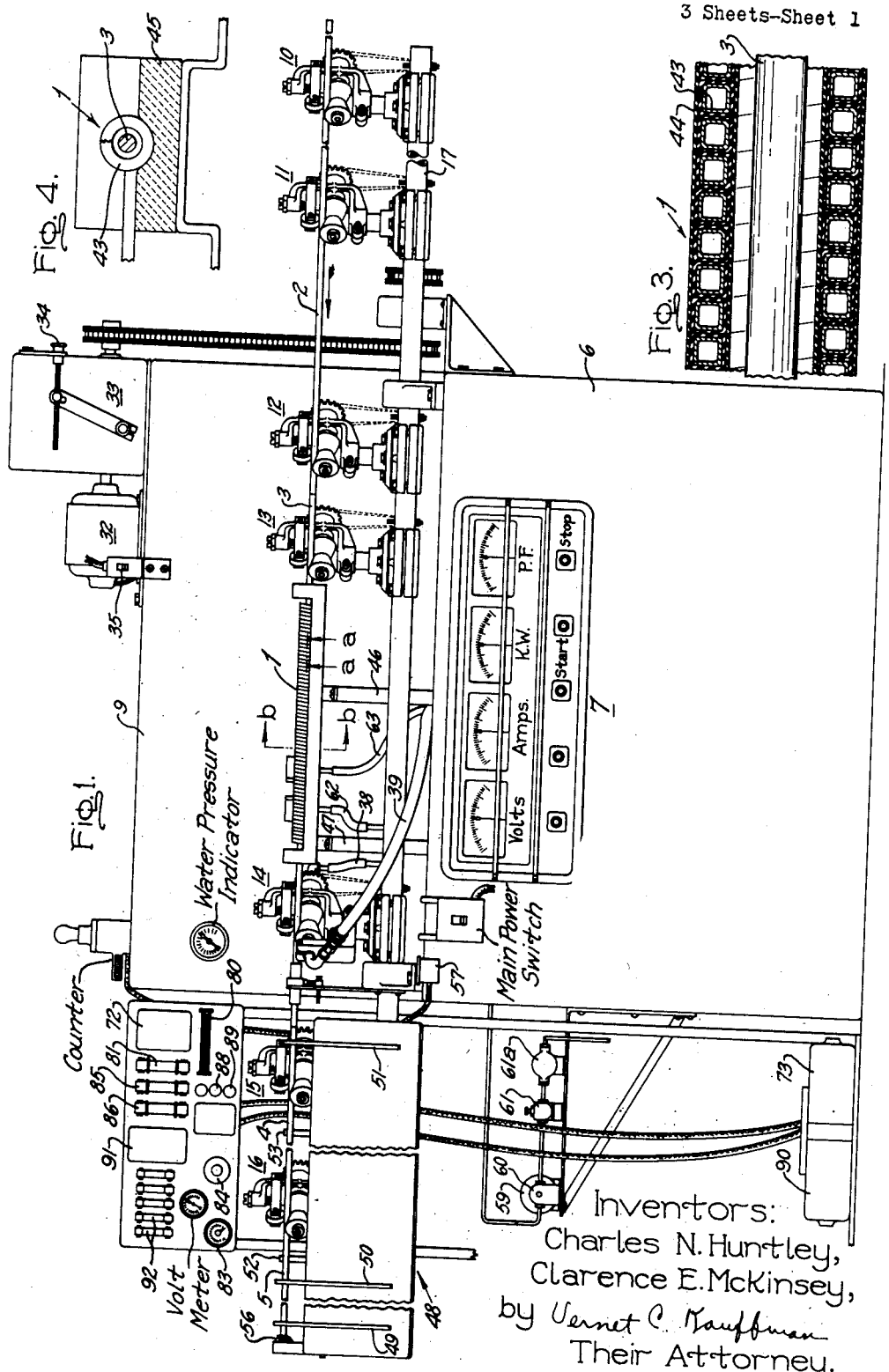
Inventors:
Charles N. Huntley,
Clarence E. McKinsey,
by Vernet C. Kauffman
Their Attorney.

June 19, 1951
C. N. HUNTLEY ET AL
2,557,745
METHOD AND APPARATUS FOR BRAZING CYLINDRICAL STOCK
Filed Dec. 31, 1947
3 Sheets-Sheet 2
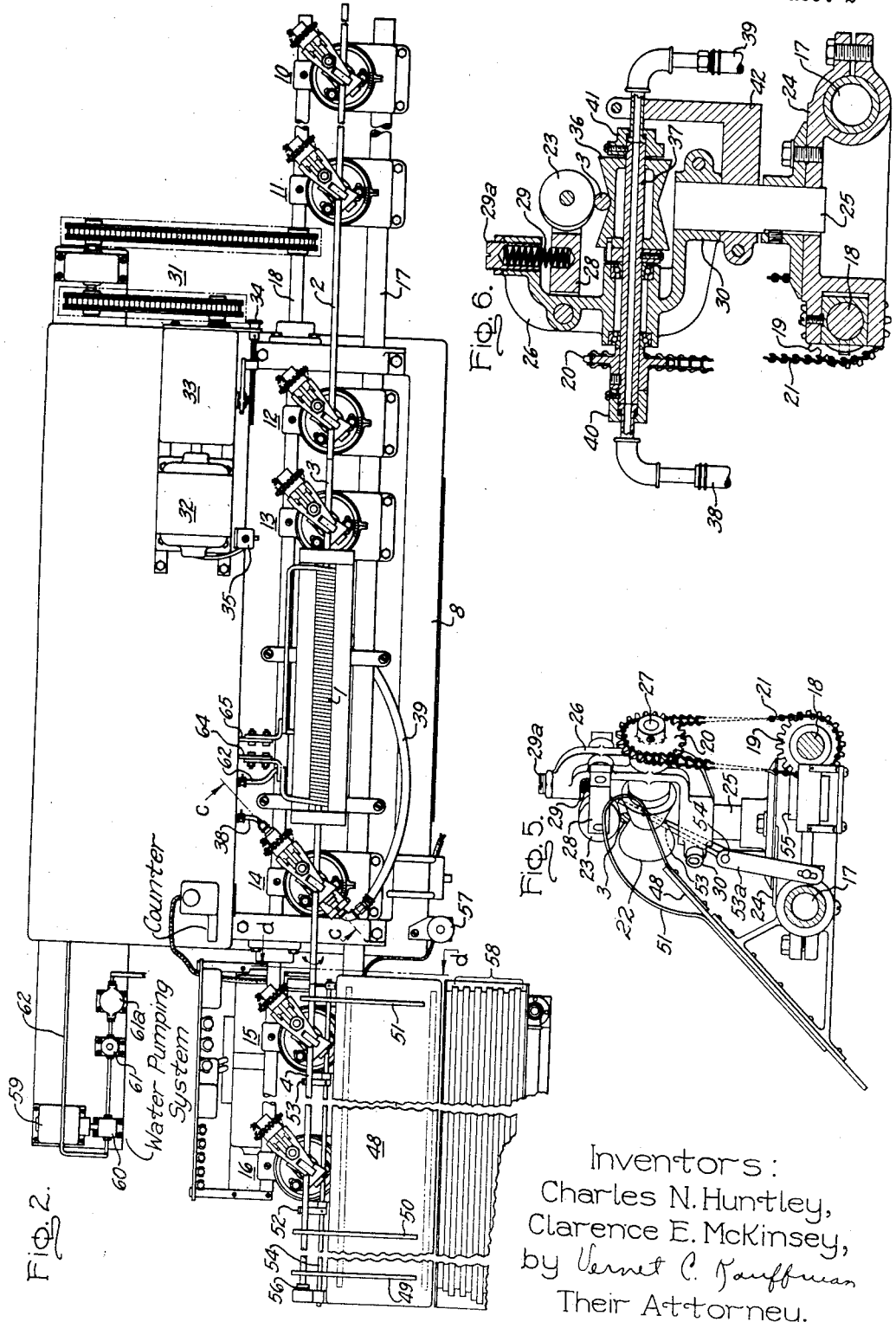
Inventors:
Charles N. Huntley,
Clarence E. McKinsey,
by Vernet C. Kauffman
Their Attorney.

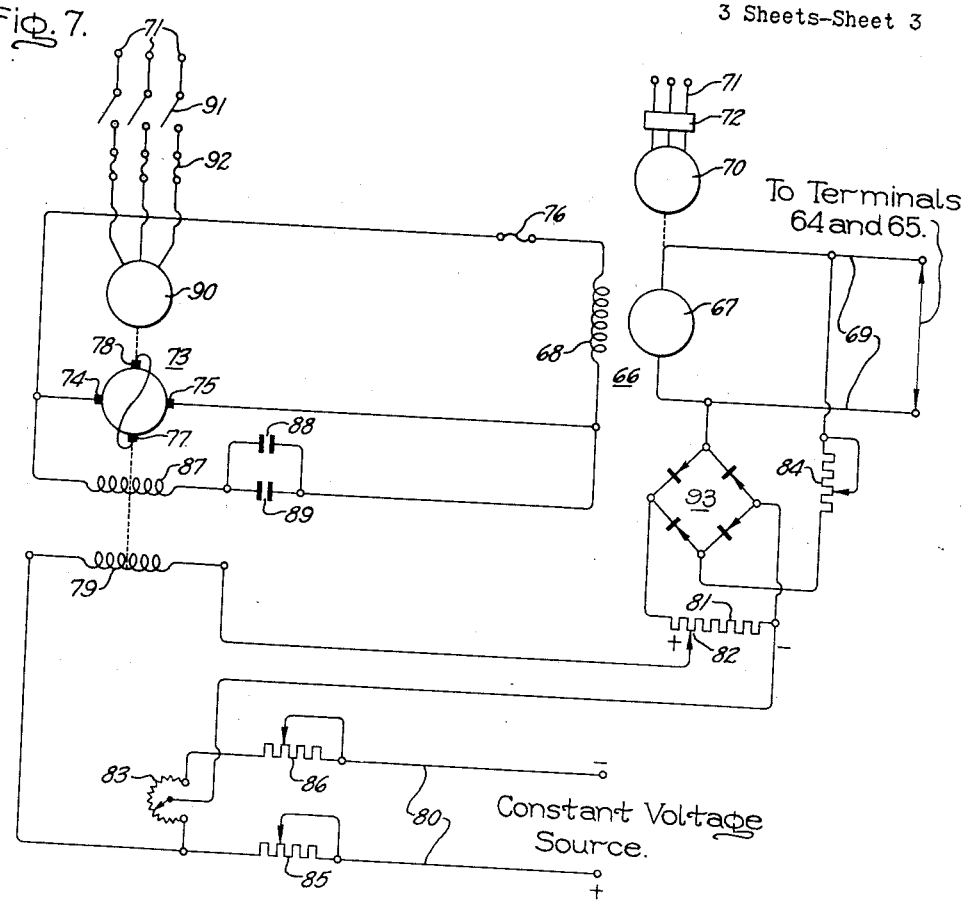

Patented June 19, 1951

2,557,745

UNITED STATES PATENT OFFICE 2,557,745

METHOD AND APPARATUS FOR BRAZING CYLINDRICAL STOCK

Charles N. Huntley, Cleveland Heights, and Clarence E. McKinsey, Painesville, Ohio, assignors to General Electric Company, a corporation of New York Application December 31, 1947, Serial No. 794,930

6 Claims. (Cl. 219—10)

Our invention relates to methods, machines and apparatus for welding and brazing cylindrical or tubular stock, such as core-rod, electric cable, and the like.

Heretofore, in brazing or welding core material or stock comprising an inner core member and an outer metallic sheath or tube, the stock has been placed in gas furnaces, and in order to obtain the necessary uniform union of the core and the tube it has been necessary to assure constant gas flow and constant furnace temperatures. In such furnaces, as a support for the stock, suitable tubes are usually employed which require frequent replacement.

The above described defects, unless obviated by expensive manufacturing procedures which entail very close inspection by personnel and continuous presence of operators, would of course result in defective products. This effect is enormous where high quality and uniformity of product are required. For example, in the case of core-rod which is subsequently drawn down by means of dies, to form lead-in conductors for electric lamps and electric discharge devices, such non-uniformities will result in a large number of defective finished products, since a defect in a large diameter rod will be evidenced in a very large number of finished lead-in wires of a diameter and length suitable for use in electric lamps, radio tubes, discharge devices, etc.

Furthermore, previous brazing methods wherein the core-rod, or copper tubing, is brazed by heating in a gas furnace, have entailed a further disadvantage by virtue of the very tenaciously adherent oxide which is formed on the rod during the heating operation. The oxide coating is very hard, making it necessary to repair frequently the dies through which the rod or tubing is subsequently drawn.

It is an object of our invention to provide new and improved methods of brazing or welding stock material comprising an inner core member and an outer metallic tube or sleeve.

It is another object of our invention to provide a new and improved machine for brazing cylindrical or tubular stock.

Generally speaking, in accordance with our invention we provide methods and apparatus for welding, brazing and joining cylindrical stock such as core-rod including an inner metallic core, an outer copper tube or sleeve, and having a layer of a flux between the core and the tube. The stock is passed through a high frequency magnetic field for heating the core and sleeve and particularly for melting the flux to obtain a uniform union of the core and sleeve upon cooling. In order to obtain the most effective brazing, although the utilization of our invention is not limited thereto, a magnetic field may be used having a frequency such that the depth of penetration of the induced secondary currents extends at least to the region or vicinity of the flux, and preferably penetrates just to and slightly beyond the inner boundary of the flux. We provide rotational movement to the stock as it moves through the high frequency magnetic field so that when the flux flows or is melted there is maintained an even annular distribution of the flux between the core and the outer tube. In this way we assure that upon cooling there is a uniform annular union or bond between the core and the tube, which bond is also uniform throughout the entire length of the core-rod.

We also provide a new and improved machine whereby continuous brazing of tubular stock is obtained, and whereby tubular stock can be continuously supplied to the machine and automatically unloaded, there being no need for interruptions in the manufacturing process.

For a better understanding of our invention reference may be had to the following description taken in connection with the accompanying drawing and its scope will be pointed out in the appended claims. Figs. 1 and 2 are front elevation and plan views, respectively, of a machine for carrying out the above described process, and which includes means for heating by high frequency induction core-rod and similar stock, whereby the stock is translated through a heating coil and rotated to obtain the desired welding or brazing of component parts of the stock. Figs. 3 and 4 are cross-sectional views of the high frequency heating coil through which the stock is moved.

Fig. 5 is a detail view of one of the driving heads, and Fig. 6 is a detail view of the water-cooled driving head immediately to the left of the heating coil as viewed in either Figs. 1 and 2. Fig. 7 is a diagrammatic representation of the electric circuit for controlling the energization of the high frequency heating coil.

According to our method of welding or brazing core-rod, or other cylindrical stock such as metal-clad cable, etc., we employ a high frequency magnetic field the frequency of which is correlated to the depth of penetration required in order to produce the desired union or bond between the component parts of the stock. The depth $d$ of penetration of the induced or secondary currents in the stock may be expressed as:

$$d = 1980 \sqrt{\frac{p}{\mu f}}$$

where $d$ = depth of penetration in inches
$p$ = resistivity of the material, microhm-cm.
$\mu$ = permeability
$f$ = frequency in cycles per second Where the component parts of the stock are of the same material, the above expression may be employed to determine for a particular frequency the depth of penetration of the induced currents. In those instances where the component parts of the stock being processed are different, such as magnetic and non-magnetic materials, the above expression may be used with a reasonable degree of accuracy to obtain a rough estimate of the depth of penetration.

Furthermore, in carrying out our method we cause rotation of the cylindrical stock during the heating process in order that the melted flux is uniformly distributed annularly. Of course, the speed or lineal motion or translation through the high frequency field is related to the particular material or stock being brazed so that the flux is properly melted, and speed of rotation is also determined in order to obtain even annular distribution to assure a uniform bond when the stock is cooled or cooling after removal from the magnetic field.

Referring now to Figs. 1 and 2, which are, respectively, front elevation and plan views, we provide an apparatus for continuously brazing or welding core-rod, having magnetic or non-magnetic cores, as an example of which reference may be had to the above described core-rod having a copper sleeve and a core of a magnetic material such as a nickel-iron alloy. The machine there shown comprises a high frequency heating coil 1 for welding or brazing core-rod 2—5 which is shown as being in suitable lengths of about four to six feet for ease in handling. The coil 1 and the driving and energizing equipment may be housed in and supported by a frame 6 having a front or panel section 7, a table 8, and a set-back upper panel 9.

As a means for moving the core-rod through the high frequency heating coil 1, we provide a plurality of conveying or driving heads 10—16, which are positioned to engage the core-rod and move it to the left, through the heating coil, and ultimately to an unloading position or station. The spacing of the driving heads is correlated, of course, to the length of the stock being processed, and the position of the heads may be adjusted by movement along a supporting rod or bearing rod 17. The driving heads 10—16 are similar in construtcion and arrangement. However, driving head 14, is provided with a water-cooling channel because of its position immediate the output side of the coil 1. Fig. 5 shows the construction of driving head 15 as viewed from the plane d—d, while Fig. 6 shows the construction of driving head 14. The driving heads 10—16 are all driven from a single drive shaft 18 through individual chain and sprocket arrangements.

The driving heads 10—16 which we provide, and which are described hereinafter, serve to impart to the rod rotational movement in addition to the longitudinal or translational movement. Furthermore, each of these driving heads is adjustable so that the amount of rotational movement with respect to the longitudinal movement is controllable or adjustable.

Referring to Fig. 5, each of the heads 10—13, and 15 and 16, comprises a sprocket 19 mounted on shaft 18, a driven sprocket gear 20 and an inter-connecting link belt type chain 21. We provide in each of the driving heads a roller 22 which not only moves the rod along its intended translational course, but also imparts to it a rotational movement about its longitudinal axis so that the melted flux is uniformly distributed as explained above. Each of these rollers includes opposed beveled or truncated conical surfaces forming a cradle to hold the core-rod, and a tensioning wheel 23 engages the core-rod 2 from above. The wheel 23 exerts a downward force on the rod, thereby increasing the frictional engagement between roller 22 and the rod.

Each driving head includes an angularly positionable frame 24, supported from the bearing shaft 17 and holds a vertical electrical insulating post 25 carrying a bracket 26 which positions and holds shaft 27 on which driving roller 22 and the sprocket 20 are mounted. Tensioning wheel 23, which may be knurled, is supported from the bracket 26 by a pivoted arm 28, and is biased downwardly by an adjustable tension spring 29 supported by the bracket 26. Bracket 26 is angularly adjustable or rotatable by virtue of the collar 30 thereof which engages post 25, and serves as a means for adjusting the axis of rotation of roller 22 with respect to the longitudinal axis of the rod. In this manner, we provide means for controlling and adjusting the number of revolutions the rod is rotated per unit of longitudinal or translational movement imparted to the rod. As the axis of rotation of the roller 22 relative to the rod axis is changed from a 90 degree position to smaller or oblique angles, the number of revolutions, or the revolving motion is increased. Adjustable tensioning tap 29a for spring 29 serves as a means for varying the tensioning force applied to rods of different diameter and surface characteristics to assure uniform, synchronous and continuous rotation of the rods. The plane of rotation of the wheel 23, is parallel to or substantially parallel to the plane of rotation of the rod at the point of contact of the rod and the wheel 23.

Drive shaft 18, is in turn driven by a system of chains and sprockets from a suitable electric motor 32, through an adjustable speed reducing drive 33, having a speed adjustment 34. A start and stop switch 35 may be provided to permit separate and independent control of the driving system.

Fig. 6 shows in some detail the water-cooled driving head 14 in cross-section in the plane c—c. In this figure, elements corresponding to those shown in Fig. 5 have been assigned like reference numerals. However, it will be noted that a beveled driving roller 36 is provided with a hollow shaft 37 serving as a cooling conduit, the shaft being supplied from a cooling water system including conduits 38 and 39 and suitable water-tight bushings 40 and 41 to permit the necessary relative rotation between the stationary conduits 38 and 39 and the rotating shaft 37. This driving roller 36 may be additionally supported by a further bracket arm 42 supported by post 25.

Figs. 3 and 4 show in detail features of the high frequency heating coil 1. Of course, the design of the coil 1 will depend upon the particular application, that is, the nature of the stock to be welded or brazed. The interval of time that the stock is maintained within the coil is furthermore a function of the field strength, the thermal conductivity, and thermal capacity of the stock, etc. These factors determine the lineal speed at which the stock is moved through the coil or region of induction heating. The speed of rotation is determined by the rate of rotation required to maintain an even distribution of the melted flux.

For core-rod stock of about 0.45 inch diameter we have found that a coil 1 having 61 turns, closely spaced, may be employed. The conductor 43 constituting the coil 1 is hollow in order to permit cooling thereof, and may be square copper tubing having an outside dimension of ¼ inch, and an inside dimension of 3/16 inch, as shown in Fig. 3 which is a cross-sectional view of the coil 1 in zone a—a. The square copper tubing is insulated by suitable refractory insulation such as Plexiglas tubing, or fibre 44, dipped in insulating varnish or compound and baked for hardening. Such a coil was wound to have an inside diameter of ⅞ inch and an outside diameter of 1⅜ inch. The overall length of the coil 1 was 17⅝ inches. The core-rod was driven through the coil 1 at the rate of 24 inches per minute, and the rod was rotated one revolution per inch of linear travel.

As shown in Fig. 4, which is a cross-section view of the coil 1 through the plane b—b, the core-rod 3 is spaced from and centered in the conductor 43 as it is moved through the coil 1. The coil 1 is supported by a refractory ceramic frame 45, held above the table 8 by four thermal and electrical insulating posts, only two of which, 46 and 47, are shown in Fig. 1.

The rod is, of course, placed in the machine at the right hand side and the rod is moved through the coil 1 to the left to the unloading position where there is an inclined unloading table 48, supported by brackets from bearing shaft 17, and having positioned thereon a plurality of retarding arms 49—51, the last of which is shown in Fig. 5. One end of the retarding arm 51, which is representative of the others also, is supported from the underside of the unloading table, and is provided with a loop section through which the rod passes while held and engaged by driving heads 15 and 16. The other end of the unloading arm is formed to conform to the surface and plane of the unloading table and is spring biased toward the table surface and engages it.

In order to unload the brazed rod, we provide unloading arms 52 and 53, the latter of which is shown in Fig. 5. These arms are actuated automatically in response to finished core-rod position, and are mounted on a shaft 54 which is rotated by an electro-magnet 55 and lever-arm 53a, the magnet 55 being controlled by either switch 56 or manually operated switch 57. Switch 56 is positioned to be engaged by the end of each processed core-rod when it reaches the end of its travel. Upon actuation of switch 56, arms 52 and 53 are rotated by shaft 54, and strike the finished rod. Due to this impact the rod is moved onto the table 48 and rolls along it to be engaged and retarded by arms 49, 50 and 51, but which however permit the rod to drop. The finished rods 58 are thereby unloaded and rolled into a truck or other vehicle positioned below the unloading table 48.

We have found that it is important to maintain a constant rate of cooling of the coil 1 in order to to perform satisfactorily the welding or brazing operations by maintaining the coil resistance constant. We provide means for circulating cooling water through the hollow conductor 43 of coil 1 at contsant pressure, preferably at 60 pounds per square inch pressure for the above described coil dimensions, and transmit through the cooling system about five pints per minute. For this purpose we provide a motor 59, a pump 60, an adjustable pressure regulator 61, and a reservoir 61a. The conduit 62 is connected to the input side of the water cooling system for the coil, and a discharge conduit 63 is provided for the cooling water. Cooling water is supplied to driving head 14 through conduits 38 and 39.

High frequency electrical connections to the coil 1 are made through terminals 64 and 65. We employ a particular electrical system for energizing the coil 1 to maintain the energization of the coil constant, and to assure thereby uniform bond between the core and the sleeve. A high frequency generator 66 having an armature winding 67 and a field winding 68 supplies high frequency alternating current to coil 1 through circuit 69. Generator 66 is driven by a motor 70, which may be a three phase induction motor, energized from a three phase supply circuit 71 through a starter 72.

We employ an exciter 73, which may be of the armature-reaction-excited or amplidyne type having a pair of direct current output brushes 74 and 75 connected to the field winding 68 through a fuse 76. A pair of short-circuited brushes 77 and 78 are connected as shown. Field winding 79 supplies the principal separate excitation for the exciter 73 and is energized from a source of constant voltage direct current 80. In order to control the excitation of exciter 73 and hence the excitation of generator 66 to maintain the output voltage thereof constant, we provide a unidirectional component of voltage which varies directly as the magnitude of the alternating high frequency voltage supplied to coil 1 through circuit 69. This means may include a selenium rectifier 93 and an output adjusting voltage divider 81 having an adjustable contact 82 to provide a direct current component of voltage which opposes a component of the constant voltage source derived from a voltage divider 83. Further adjustable means, such as a rheostat 84 may be connected in series with the rectifier 93 to control the voltage which is supplied to circuit 69 and coil 1. Additional rheostats or variable resistances 85 and 86 may be connected in series with rheostat 83 to control the amount of current supplied to winding 79. Field winding 87 of exciter 73 may be used as an anti-hunt winding and is connected in series with parallel-connected capacitances 88 and 89 and is energized in response to transient voltage variations of the direct current output voltage of exciter 73. The exciter 73 is driven by a three phase induction motor 90 which may be energized from circuit 71 through a switch 91 and fuses 92.

Since the resistance of the coil 1 is maintained constant during operation by the constant rate of cooling thereof, it will be appreciated that the above-described circuit maintains constant the power supplied to the coil.

Of course, various arrangements may be used to render the machine readily adaptable to high production systems. For example, an electrical counter and indicator system as shown in Fig. 1 may be used to furnish a running and continuous count of the number of rods processed. The electrical counter may be connected in the electrical circuit of switch 56 to actuate the counter automatically. In addition the counter may be provided with an integrating means to energize a signal, such as a lamp, when the number of rods processed attains a set value.

One of the principal advantages attained by the use of our above described method and apparatus is the very substantial reduction in the amount of oxide which is formed on each rod during the high frequency brazing thereof, as contrasted with that formed when the rod is brazed in a gas furnace. In the case of copper rod brazen by high frequency, there is much less oxide formed, and this advantage is further enhanced by the radical difference in the nature of the oxide, which is readily removed by mild impact or mild rubbing, which is a very marked advantage because much less frequent repair of the dies employed in the subsequent drawing operations is required. If desired, a separate hydrogen burner (not shown) may be used to deoxidize the rod as it emerges from the coil 1, thereby rendering the stock completely free of oxide coating.

In brazing a core-rod stock comprising an inner magnetic core and an outer sheath or copper tube having therebetween a sheath or layer of brass brazing flux, we have found that where the over-all outside dimension is about 0.45 inch, and the copper tube is about 35 mils thick, that very satisfactory welding or brazing is obtained between the core and the tube by using a magnetic field having a frequency of 9600 cycles per second, the interval of time that the stock is maintained within the magnetic field depending, of course, on the strength of the field, which of course, is determinative of the rate of movement of the stock through the field. In such instances, the brass flux may be about 70 per cent zinc and 30 per cent copper, having a thickness of about 2 to 3 mils, and wound in strip form about the core prior to placing it in the outer copper sleeve or tube. Under such conditions, and using a high frequency current of 67 amps., we have found that magnetic core-rod of the stated dimensions may be very satisfactorily brazed by moving the rod through the coil 1 at the rate of 24 inches per minute and by imparting to the rod a rotational movement of one revolution per inch of linear travel, that is, the rod is rotated at 24 R. P. M. For the stated conditions, the amount of power supplied to the coil 1 was 13.5 kw.

For a magnetic core-rod of the above stated dimensions and using a frequency of 9600 cycles per second, the secondary or induced currents do not, of course, penetrate to the region of the brass flux, inasmuch as it will be appreciated that the presence of the magnetic core serves to limit the depth of penetration of the currents to a value less than that established by the above equation. However, due to the high thermal conductivity of the copper constituting the sheath, the heat produced by the induction quickly flows to the lower melting point flux to melt it as is desired.

What we claim as new and desire to secure by Letters Patent of the United States is:

1. The method of brazing cylindrical stock, including a magnetic core, a copper sheath completely enclosing said core and a flux therebetween, which comprises passing the stock through an alternating magnetic field of a frequency to produce an appreciable depth of penetration of the induced currents into said sheath, and rotating the stock to maintain an even distribution of the melted flux.

2. The method of brazing core-rod, including a core comprising an iron alloy, a copper sleeve completely enclosing said core and an interspaced tube of a brazing flux, which comprises passing the rod through an alternating magnetic field to produce a depth of penetration of the induced currents sufficient for melting the flux, and rotating said rod to maintain an even annular distribution of the flux.

3. The method of brazing core-rod, including a core including iron, a copper sleeve completely enclosing said core and an interspaced tube of a brazing flux, which comprises passing the rod through an alternating high frequency magnetic field of a frequency such that the induced currents in said rod penetrate toward the region of the flux to melt the flux, and rotating said rod to maintain an even annular distribution of the flux.

4. The method of brazing cylindrical stock comprising a magnetic core, a copper outer tube completely enclosing said core and an interspaced flux, without effecting substantial oxidation of the copper tube, which comprises passing the stock through a high frequency magnetic field having a frequency which causes appreciable penetration of the secondary currents into said tube while continuously rotating said stock to maintain an even annular distribution of the melted flux between the tube and the core, and subsequently drawing the stock down to wire of relatively fine diameter.

5. The method of brazing core rod of about .45 inch diameter and including a core comprising iron, a copper sleeve about 35 mils thick and an intervening layer of metallic brazing flux, which method comprises rotating the rod about its axis at a rate of about 24 R. P. M. and passing it linearly at a speed of about 24 inches per minute through an alternating magnetic field having a frequency of about 9600 cycles per second and a power supplied thereto of about 13.5 kw.

6. In a machine for brazing cylindrical stock including an inner metallic core and an outer metallic tube with an intervening layer of flux therebetween, the combination comprising a coil of about 61 closely spaced turns of a hollow conductor helically coiled to an inside diameter of about ⅞ inch, means for supplying to said coil an alternating current having a frequency of about 9600 cycles per second at a power input of about 13.5 kw., means for circulating cooling water through said coil at constant pressure, and drive means constructed and arranged to move said stock linearly through the interior of said coil at a speed of about 24 inches per minute while rotating said stock about its axis at a rate of about one revolution per inch of linear travel.

CHARLES N. HUNTLEY.
CLARENCE E. McKINSEY.

REFERENCES CITED

The following references are of record in the file of this patent:

UNITED STATES PATENTS

| Number | Name | Date |
|---|---|---|
| 1,453,358 | Kettering | May 1, 1923 |
| 2,040,767 | Dudley | May 12, 1936 |
| 2,297,878 | Denneen et al. | Oct. 6, 1942 |
| 2,329,944 | Schakenbach | Sept. 21, 1943 |
| 2,360,185 | Wrighton et al. | Oct. 10, 1944 |

FOREIGN PATENTS

| Number | Country | Date |
|---|---|---|
| 439,166 | Great Britain | Dec. 2, 1935 |
| 467,308 | Great Britain | June 15, 1937 |

OTHER REFERENCES

Babat, "Construction of Heating Coils for Induction Surface Hardening," in "Heat Treating and Forging," Jan. 1941, page 39.